US009618138B2

(12) United States Patent
Manger et al.

(10) Patent No.: US 9,618,138 B2
(45) Date of Patent: Apr. 11, 2017

(54) ADJUSTABLE DAMPING VALVE ARRANGEMENT

(71) Applicants: Thomas Manger, Wasserlosen (DE);
Stefan Schmitt, Gochsheim (DE);
Bernd Zeissner, Volkach (DE)

(72) Inventors: Thomas Manger, Wasserlosen (DE);
Stefan Schmitt, Gochsheim (DE);
Bernd Zeissner, Volkach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 454 days.

(21) Appl. No.: 13/923,548

(22) Filed: Jun. 21, 2013

(65) Prior Publication Data

US 2013/0340865 A1 Dec. 26, 2013

(30) Foreign Application Priority Data

Jun. 21, 2012 (DE) .................. 10 2012 210 459

(51) Int. Cl.
| | | |
|---|---|---|
| *F16K 17/26* | (2006.01) | |
| *F16K 47/00* | (2006.01) | |
| *F16F 9/46* | (2006.01) | |

(52) U.S. Cl.
CPC .............. *F16K 47/00* (2013.01); *F16F 9/464* (2013.01); *F16F 9/465* (2013.01); *Y10T 137/8593* (2015.04)

(58) Field of Classification Search
CPC  F16F 9/464; F16F 9/465; F16K 47/00; Y10T 137/8593; Y10T 137/7771; Y10T 137/7779; Y10T 137/7838; Y10T 137/7841
See application file for complete search history.

(56) References Cited

U.S. PATENT DOCUMENTS

| | | | | |
|---|---|---|---|---|
| 2,697,496 A | * | 12/1954 | McIntyre .............. | F16F 9/3484 137/493.4 |
| 4,858,736 A | * | 8/1989 | Arnaud ................ | B62D 55/112 137/493.8 |
| 4,880,068 A | * | 11/1989 | Bronson ................ | E21B 10/25 175/369 |
| 5,205,385 A | | 4/1993 | Ashiba | |

(Continued)

FOREIGN PATENT DOCUMENTS

DE          19822448          1/1999

*Primary Examiner* — Jessica Cahill
(74) *Attorney, Agent, or Firm* — Cozen O'Connor

(57) ABSTRACT

An adjustable damping valve arrangement comprises an adjustable damping valve in which flow is bidirectional, wherein a pressure-dependent supplementary valve is associated with the adjustable damping valve in series therewith for each through-flow direction, wherein each supplementary valve has at least one separate through-channel, the outlet side thereof being at least partially covered by at least one valve disk, wherein the flow path proceeding from the adjustable damping valve in flow direction is carried out through the first supplementary valve from a smaller inlet diameter to a larger outlet diameter, and the at least one valve disk carries out a peripheral lift movement, wherein the flow path through the second supplementary valve in flow direction to the adjustable damping valve is implemented from a larger inlet diameter to a smaller outlet diameter.

8 Claims, 3 Drawing Sheets

(56) References Cited

U.S. PATENT DOCUMENTS

| | | | | |
|---|---|---|---|---|
| 6,371,264 | B1* | 4/2002 | Deferme | F16F 9/516 |
| | | | | 188/282.6 |
| 6,860,369 | B2 | 3/2005 | Weiffen | |
| 6,981,577 | B2* | 1/2006 | Katayama | F16F 9/537 |
| | | | | 188/267.1 |
| 8,789,667 | B2* | 7/2014 | Heyn | F16F 9/464 |
| | | | | 188/282.2 |
| 8,794,407 | B2* | 8/2014 | Vanbrabant | F16F 9/464 |
| | | | | 188/282.1 |
| 2006/0118372 | A1* | 6/2006 | Hammer | F16F 9/34 |
| | | | | 188/284 |
| 2006/0185948 | A1* | 8/2006 | Schmitt | F16F 9/3485 |
| | | | | 188/282.5 |
| 2009/0090588 | A1* | 4/2009 | Berger | F16F 9/3485 |
| | | | | 188/322.15 |
| 2009/0127039 | A1* | 5/2009 | Zeissner | F16F 1/328 |
| | | | | 188/266.5 |

* cited by examiner

ADJUSTABLE DAMPING VALVE ARRANGEMENT

BACKGROUND OF THE INVENTION

1. Field of the Invention

The present invention is directed to an adjustable damping valve and associated supplementary valves.

2. Description of the Related Art

An adjustable damping valve arrangement known from DE 198 22 448 A1 has a pressure-dependent supplementary damping valve disposed in series upstream of an adjustable main stage valve. The supplementary damping valve is constructed in a manner known from bottom valves which are known per se. A damping valve body has separate through-channels for both through-flow directions, which through-channels are at least partially covered at the outlet side thereof by at least one valve disk in each instance. A central fastening pin fixes the valve disks at their inner diameters.

The main stage valve has a smaller diameter than the lift region of the supplementary valve. The flow path to an auxiliary valve is carried out in turn very close to a center axis of the damping valve arrangement so that the damping medium is deflected radially inward after passing through the supplementary valve so as to flow as directly as possible to the main stage valve and auxiliary valve. To this end, a valve housing has a corresponding deflecting profile.

It is an object of the present invention to optimize the flow path between the supplementary valve and the adjustable damping valve with respect to flow resistance.

SUMMARY OF THE INVENTION

According to the invention, this object is met in that the flow path proceeding from the adjustable damping valve in flow direction is carried out through the first supplementary valve from a smaller inlet diameter to a larger outlet diameter, and the at least one valve disk carries out a peripheral lift movement, wherein the flow path through the second supplementary valve in flow direction to the adjustable damping valve is implemented from a larger inlet diameter to a smaller outlet diameter.

The orientation of the flow paths obviates optimization of the flow contour in the housing of the damping valve arrangement. Trials have shown that flow noises inside the damping valve arrangement are minimized based on the invention.

In a further advantageous embodiment, the at least one valve disk of the second supplementary valve is centered at its outer diameter with respect to the supplementary damping valve body. This increases the installation space for an outflow radially inwardly.

The same basic idea is pursued in that at least one valve disk of the first supplementary valve is centered at its inner diameter. The centering ring at this valve also does not obstruct outflow out of the valve.

It is further provided that the valve disks of the first supplementary valve and of the second supplementary valve are fixed separately. A fastening pin for the first supplementary valve can be constructed so as to be correspondingly short. The installation space freed up in this way is available as flow path.

In a further advantageous embodiment, the at least one through-channel of the first supplementary valve has a radial portion which adjoins a center incident flow region. The radial portion causes the radial offset within the flow path.

According to an advantageous embodiment, the second supplementary valve has an annular cover at which is supported at least one valve spring which exerts a preloading force on the at least one valve disk of the second supplementary valve. The annular cover affords the possibility of a large flow cross section between supplementary valves and the adjustable damping valve.

To further perfect the deflected flow, an angle ring is associated with the at least one valve disk of the second supplementary valve, this angle ring having a supporting surface for the at least one valve disk. The angle ring offers a supporting surface on one side for limiting the opening movement and for a directed lift movement of the at least one valve disk.

Accordingly, the angle ring contacts the at least one valve disk in the region of the outer diameter thereof. In this way, the valve disk lifts first at the inner diameter.

The angle ring is centered radially by a web of the annular cover. This step also serves the aim of an unrestricted flow path to the supplementary valves.

For purposes of a simple assembly, particularly the production of a constructional unit which can be assembled beforehand and which can accordingly be checked easily, the annular cover forms an interference fit with the supplementary valve.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described more fully referring to the following description of the drawings in which.

DETAILED DESCRIPTION OF THE PRESENTLY PREFERRED EMBODIMENTS

Figure 1:
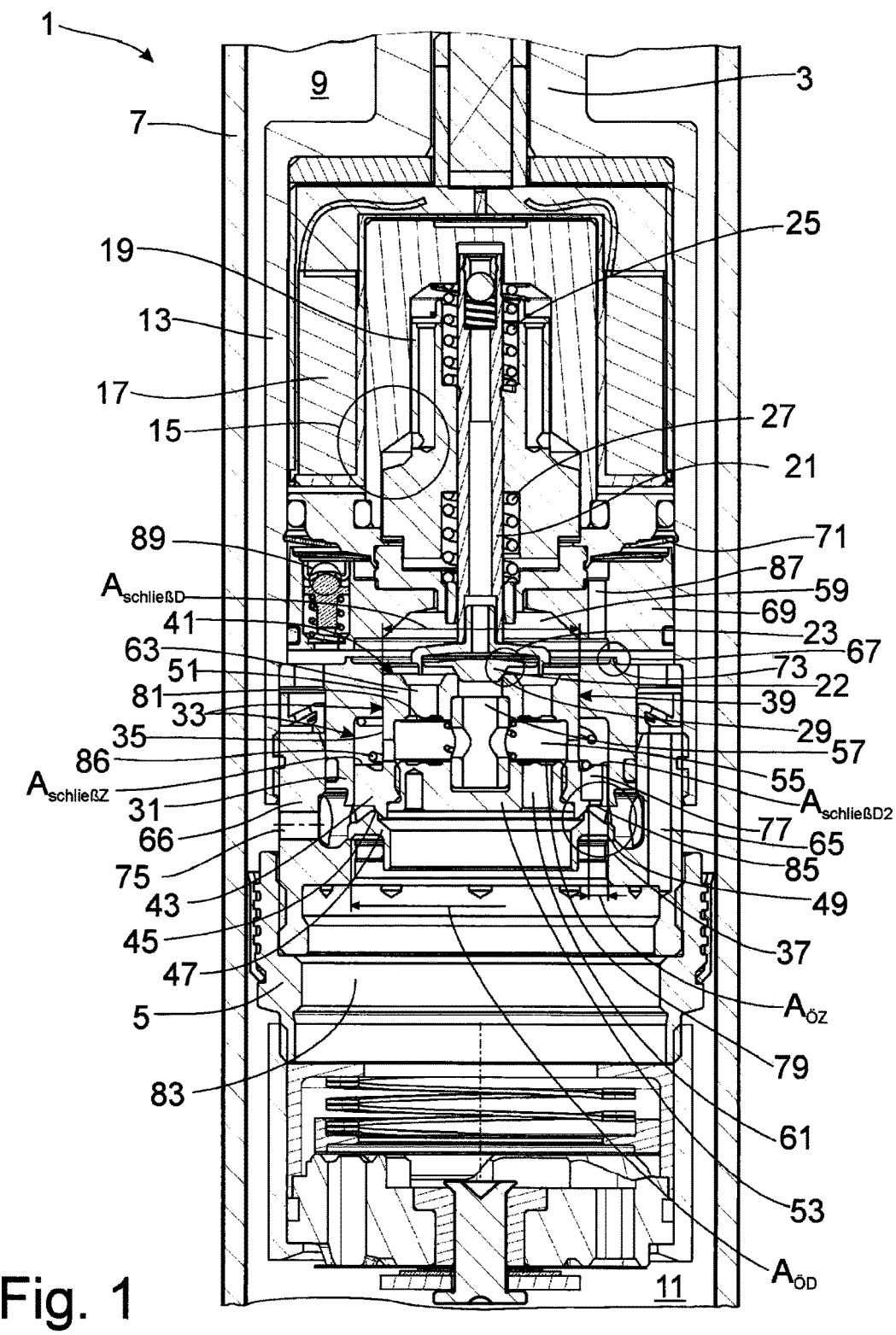
FIG. 1 is a cross-sectional view of a damping valve arrangement with supplementary valves.

FIG. 1 shows a damping valve arrangement 1 which is fastened, e.g., to a piston rod 3 of a vibration damper, shown only partially. The damping valve arrangement 1 comprises a piston 5 which divides a cylinder 7 into a working chamber 9 on the piston rod side and a working chamber 11 remote of the piston rod, both of which working chambers 9; 11 are filled with damping medium. In this embodiment, the damping valve arrangement is fastened to the piston rod 3, but the invention is not limited to an arrangement of this kind.

An actuator 15 of optional design is arranged in an outer housing 13. Serving as actuator in this example is a magnetic coil 17 which exerts a force on an axially movable armature 19, this force being transmitted to a two-part auxiliary valve body 21 of an auxiliary valve 23. At least one valve spring—in this variant, two valve springs 25; 27 acting in opposite directions are used—preloads the auxiliary valve body 21 in the lift direction with respect to an auxiliary valve surface 29 of the auxiliary valve 23. The actuator 15 acts in the closing direction of the auxiliary valve 23. The force of the at least one valve spring 25; 27 and the force of the actuator 15 form a resultant force which acts on the auxiliary valve body 21 in lift direction.

A stepped opening 33 in which a valve body 35 of a main stage valve body 37 can execute an axial movement is formed in an inner housing 31 of the damping valve arrangement 1. The valve body 35 has a guide sleeve 39 whose back side 41 forms an additional surface $A_{Schließ\beta D}$ that is pressure-impinged by damping medium. Further, the valve body 35 has a radial shoulder 43 which has an additional pressure-impinged surface $A_{Schließ\beta D2}$ in the direction of the back side 41.

In a neutral position of the piston rod 3, i.e., in the absence of opening force, the valve body 35 contacts a valve seat surface 45 of an axially movable valve ring 47 which contacts a housing-side valve seat surface 49 at the side of the axially movable valve ring 47 facing in direction of the working chamber 11 remote of the piston rod.

The valve body 35 is constructed in a two-shelled manner. An outer cup 51 forms the guide sleeve 39 and the radial shoulder 43. In a separation plane, an inner disk 53 defines with the cup 51 a radial damping medium flow path 55 between the additional pressure-impinged surface $A_{Schließ\beta D2}$ and a control space 57 whose outlet cross section is determined by the valve body 21 in direction of a rear space 59.

The additional surface $A_{Schließ\beta D2}$ of the valve body 35 can be acted upon with damping medium via at least two flow paths. A first feed flow channel 61 is formed directly in the valve body 35 as an axial passage. A second feed flow channel 63 extends on a partial portion inside the valve body 35 between the rear space 59 of the main stage valve 37 and the damping medium flow path 55. A flow connection 65 of the rear space 59 to the working chamber 11 remote of the piston rod inside a connection sleeve 66 between the outer housing 13 and the piston 5 is controlled by an emergency operation valve 67. The emergency operation valve 67 is formed by a valve ring 69 which is lifted from an emergency operation valve seat surface 73 by the actuator 15 against the force of at least one closing spring 71. Even a slight application of energy for the actuator 15 is sufficient to achieve the lift movement of the valve ring 69. In this example, the magnetic force of the magnetic coil 17 acts on the valve ring 69. As a result of apt dimensioning of the spring forces and magnetic forces, a strict separation can be achieved between an emergency operating state and a normal operating state. In this way, the flow path between the rear space 59 and the working chamber 11 remote of the piston rod can be influenced by means of the emergency operation valve 67.

At least one connection orifice 75 leading from the working chamber 9 on the piston rod side to the pressure-impinged surface $A_{\ddot{O}Z}$ at the underside of the radial shoulder and to the control space 57 is formed in the connection sleeve 66 of the damping valve arrangement 1. For this purpose, the main stage valve body has at least one axial opening 77 in the region of the radial shoulder 43.

The feed flow channels 61; 63 are safeguarded by check valves 79; 81 so that the damping medium does not escape through the feed flow channels 61; 63 in the valve body 35 in direction of the working chamber 11 remote of the piston rod when there is incident flow via the connection orifice 75. In so doing, the check valve 81 is connected via the feed flow channel 63 to the rear space 59 which is part of the second feed flow channel. When damping medium flows out of the rear space 59 in direction of the additional surface $A_{Schließ\beta D2}$, the check valve 81 opens the flow path.

There are four basic operating states to be considered. A first operating state of the damping valve arrangement 1 is characterized by an incident flow proceeding from the working chamber 11 remote of the piston rod via a port 83 to the valve ring 47 and valve body 35. The emergency operation valve 67 is switched on, i.e., it is lifted from its emergency operation valve seat surface 73 as in the illustrated position, and the actuator 15 acts against the force of the valve springs 25; 27. The damping medium flows along the first feed flow channel 61 in the valve body 35 and the opened check valve 79, then further along the damping medium flow path 55 to the additional valve closing surface $A_{Schließ\beta D2}$. A first closing force component exerts the pressure on this valve closing surface $A_{Schließ\beta D2}$. Further, damping medium flows through the flow connection 65 in the connection sleeve 66 and through the opened emergency operation valve 67 into the rear space 59, then through the open check valve 81 to the additional pressure-impinged surface $A_{Schließ\beta D2}$. As was already described, the back side 41 of the valve body 35 represents the pressure-impinged surface $A_{Schließ\beta D}$. The closing force acting on the valve body 35 is composed of the resultant closing force which acts directly on the back side 41 of the valve body 35 via the auxiliary valve body and the pressure forces on surfaces $A_{Schließ\beta D}$ and $A_{Schließ\beta D2}$. Because of the comparatively low throttle losses, the pressure level at surfaces $A_{Schließ\beta D}$ and $A_{Schließ\beta D2}$ is similar to that in the working chamber remote of the piston rod, among other reasons because the damping medium flow path to the additional surface $A_{Schließ\beta D2}$ has an outlet throttle 85 in the flow direction with respect to the additional surface $A_{Schließ\beta D2}$. A surface $A_{\ddot{O}D}$ at the valve ring 47 is slightly larger than the sum of surfaces $A_{Schließ\beta D}$ and $A_{Schließ\beta D2}$ so as to exclude blocking of the lift movement of the valve body 35 due to the pressure ratios. The pressure in the control space 57 of the main stage valve body plays no part in this incident flow direction of the damping valve arrangement because the auxiliary valve is bypassed by the flow connection 65 to the rear space 59.

A second operating state is the emergency operating state of the damping valve arrangement 1 and of an incident flow of the damping valve arrangement 1 proceeding from port 83. The emergency operation valve 67 is closed due to the absence of energy input via the actuator 15. The auxiliary valve body 22 is guided so as to be slightly displaceable axially inside the auxiliary valve body 21. In the deenergized state of the magnetic coil 17, the valve springs 25; 27 hold the auxiliary valve body 21, considered statically, i.e., without incident hydraulic flow, at a maximum distance from the auxiliary valve seat surface 29. Therefore, the auxiliary valve body 22 can occupy a maximum lift position when loaded even by the slightest pressure proceeding from the control space 57. Valve 23 is closed or slightly open depending on the adjustment of the valve springs 25; 27. As in the normal operating state, the damping medium reaches the additional pressure-impinged surface $A_{Schließ\beta D2}$ via the feed flow channel 61 in the valve body 35 and the open check valve 79. In order that the valve body 35 together with the valve ring 47 can lift off from the housing-side valve seat surface 49 regardless of the switching position of the emergency operation valve 67, the check valve 81 in valve body 35 opens so that damping medium which is displaced from the rear space 59 can flow off via the feed flow channel 63 in valve body 35 in direction of the additional pressure-impinged surface $A_{Schließ\beta D2}$.

The third operating state concerns an incident flow of the damping valve arrangement 1 proceeding from the working chamber 9 on the piston rod side and open emergency operation valve 67. The damping medium flows through the connection orifice 75 in the connection sleeve 66 to the pressure-impinged surface $A_{ÖZ}$ at the radial shoulder 43 and then to the pressure-impinged surface which now functionally forms a closing surface $A_{Schließ\beta Z}$. The pressure-impinged surface at the radial shoulder of the main stage valve body is operative for both incident flow directions of the damping valve arrangement. Depending on the energy supply of the actuator 15, there ensues an auxiliary valve position by which, in turn, a control pressure in the control space 57 and accordingly also at the pressure-impinged surface $A_{Schließ\beta Z}$ can be controlled. The pressure acting on an annular surface $A_{ÖZ}$ opposes the pressure acting in the closing direction on surface $A_{Schließ\beta Z}$. Because of the outlet throttle 85 which now functions as an inlet throttle, there is a pressure gradient between the pressures at surfaces $A_{ÖZ}$ and $A_{Schließ\beta Z}$ when the auxiliary valve 23 is open so that the hydraulic opening force at the valve body 35 is always somewhat greater than the hydraulic closing force. The pressure in the connection orifice 75 also acts on the valve ring 47 which is accordingly pressed on the housing-side valve seat surface 49. Therefore, the valve body 35 lifts from the valve seat surface 45 of the valve ring 47.

The damping medium flowing out of the control space 57 through the auxiliary valve 23 arrives in the rear space 59 and through the open emergency operation valve 67 and flow connection 65 in the connection sleeve 66 into the working chamber 11 remote of the piston rod. Consequently, the rear space 59 has an inlet and an outlet with the working chamber 11 of the vibration damper.

In the fourth operating state, the feed flow again takes place via the connection orifice 75 in the connection sleeve 66, but the emergency operation valve 67 is closed. The flow path to the auxiliary valve 23 corresponds to the description of the third operating state. In contrast, the auxiliary valve 23 is opened to the maximum degree due to the lack of power supply of the actuator 17. A closing spring 86 ensures that the main stage valve body 35 together with the valve ring 47 is seated on the housing-side valve seat surface 49. This prevents a hydraulic short circuit between the working chambers via the connection orifice 75. The damping medium arrives in the rear space 59 whose outlet is blocked by the closed emergency operation valve 67. A flow path 87 to a pressure limiting valve 89 by which a defined pressure level can be determined in the rear space 59 is formed in the valve ring 69 of the emergency operation valve 67. The pressure level in the rear space 59 and, therefore, on the back side 41 of the valve body 35 and on the pressure-impinged surface at the radial shoulder $A_{Schließ\beta Z}$ determines the closing force in emergency operation of the damping valve arrangement 1. It is clear from a comparison of the second operating state and fourth operating state that the emergency operation valve is effective only in an incident flow direction of the damping valve arrangement 1 via the connection orifice 75. Trials have shown that this configuration of the damping valve arrangement 1 is suitable for reliable operating behavior of a vibration damper.

The damping valve arrangement further comprises a first pressure-dependent supplementary valve 91 and a second pressure-dependent supplementary valve 93 which are associated with the adjustable damping valve 37 in series therewith. The supplementary valve combination is arranged inside a tubular housing 95 which can be mounted at the outer valve housing 13.

Figure 2:
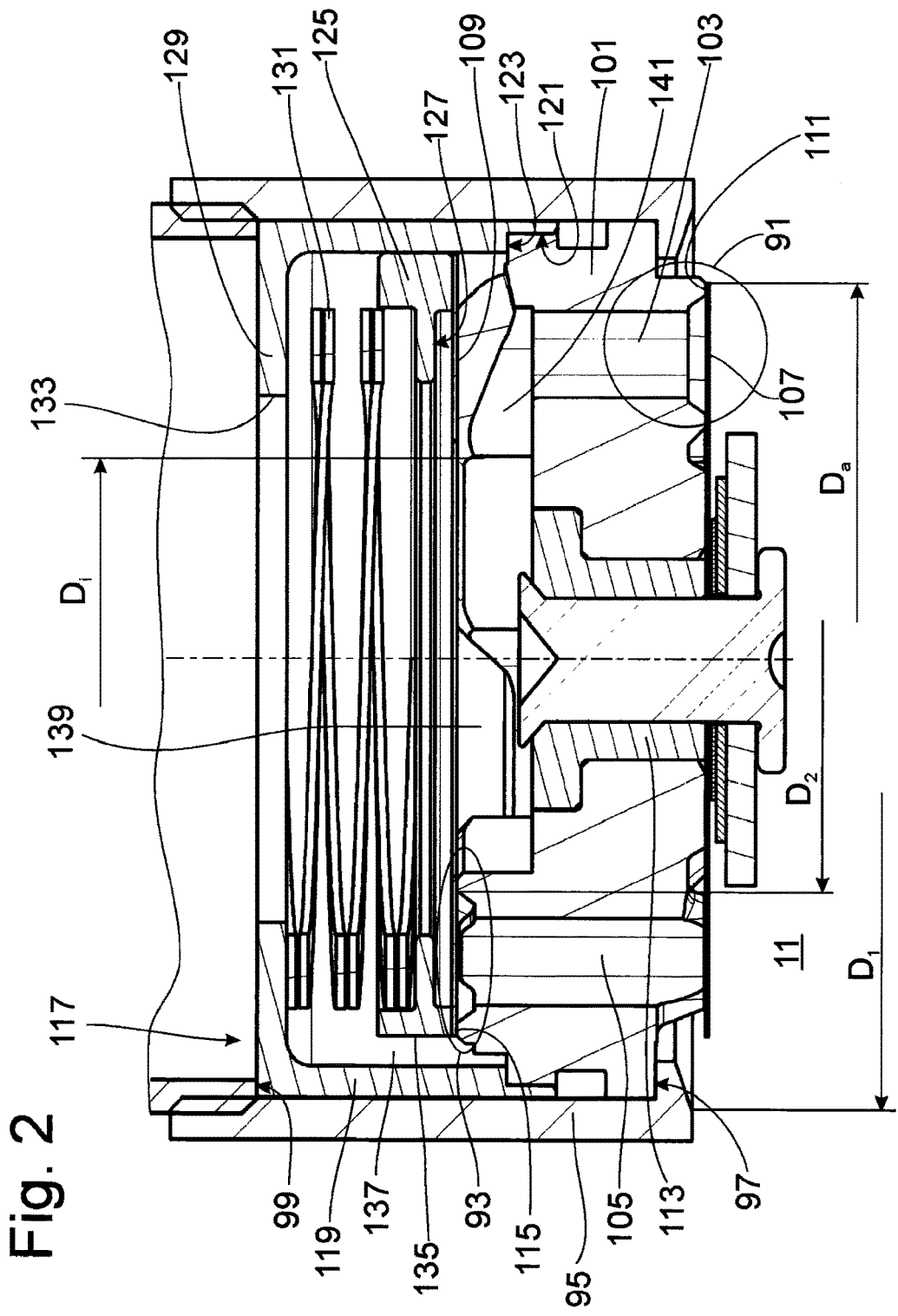
FIG. 2 is a view of a detail of a tubular housing with supplementary valves in cross-section.

FIG. 2 is limited to the depiction of the tubular housing 95 with the supplementary valves 91; 93. A supplementary damping valve body 101 is axially fixed in the tubular housing 95 between a radial seating surface 97 of the tubular housing 95 and an end face 99 of the outer housing 13. The supplementary damping valve body 101 has at least one separate through-channel 103; 105 for each supplementary valve 91; 93, and the outlet side of the separate through-channel 103; 105 is at least partially covered by at least one valve disk 107; 109.

The at least one valve disk 107 of the first supplementary valve 91 is fixed to a valve seat surface 111 facing in direction of the working chamber 11 remote of the piston rod by a fastening pin 113 which centers the valve disk 107 at the inner diameter. The fastening pin 113 can be constructed, e.g., as a rivet or screw.

The at least one valve disk 109 of the second supplementary valve 93 is arranged on a valve seat surface 115 facing in direction of the adjustable main stage valve 37 (FIG. 1) and is centered at its outer diameter with respect to the supplementary damping valve body 101. For this purpose, an annular cover 117 is used which has a circumferential web 119 forming an interference fit with an outer lateral surface 121 of the supplementary damping valve body 101. A projection of the supplementary damping valve body 101 serves as an axial supporting surface 123 for the annular cover 117.

An angle ring 125 is arranged on the at least one valve disk 109 of the second supplementary valve 93 in the region of the outer diameter. The angle ring 125 has a supporting surface 127 for the valve disk(s) 109 on the radially inner side. At least one valve spring 131 of the second supplementary valve 93 is clamped between a cover edge 129 and the angle ring 125. In this case, a set of a plurality of disk springs is used. Accordingly, the valve disks 107; 109 of the first supplementary valve 91 and second supplementary valve 93 are fixed separately. Accordingly, a free flow path for the two supplementary valves 91; 93 is provided radially inside a cover opening. On the outer side, the angle ring 125 has at least one flattened portion 135 which forms a flow passage 137 with the web 119 of the annular cover 117.

With respect to assembly, the supplementary damping valve body 101 is outfitted with the at least one valve disk 107 of the first supplementary valve 91 and is fixed by the fastening pin 113. Thereafter, the at least one valve disk 109 of the second supplementary valve 93 is placed on the valve seat surface 115, the angle ring 125 is put together with the valve spring 131 and positioned over the annular cover 17. As was already mentioned, an interference fit holds the annular cover 117 together with the supplementary damping valve body 101. This constructional unit can be checked for correct functioning before being mounted in the damping valve arrangement 1. Finally, the constructional unit is fixed to the outer valve housing 13 by the tubular housing 95.

With an incident flow proceeding from the working chamber 11 remote of the piston rod in direction of the adjustable main stage valve 37, the damping medium flows from a larger inlet diameter $D_1$ via the at least one through-channel 105 to a smaller outlet diameter $D_2$. With a smaller opening force on the valve disk 109 of the second supplementary valve 93, the at least one valve disk 109 lifts first at the inner diameter. With a larger opening pressure, the entire valve disk 109 can lift from the valve seat surface 115 against the force of the valve springs 131. A portion of the damping medium can then also flow via the flow passage 137. In so doing, the supporting surface 127 limits the shielding of the at least one valve disk 109. A large center incident flow region 139 is available radially inwardly as flow channel leading directly to the main stage valve 37. There is practically no longer any flow resistance between the outlet side of the second supplementary valve 93 and the main stage valve 37.

With an incident flow to the main stage valve via the connection orifice 75 (see FIG. 1), the damping medium exiting from the main stage valve 37 flows via the open annular cover 117 into the center incident flow region 139 adjoining the at least one radial portion 141 of the at least one through-channel 103 of the first supplementary valve 91. The inlet diameter $D_i$ into the at least one through-channel 103 is smaller than the outlet diameter $D_a$, wherein the valve disk 107 carries out a peripheral lift movement.

Figure 3:
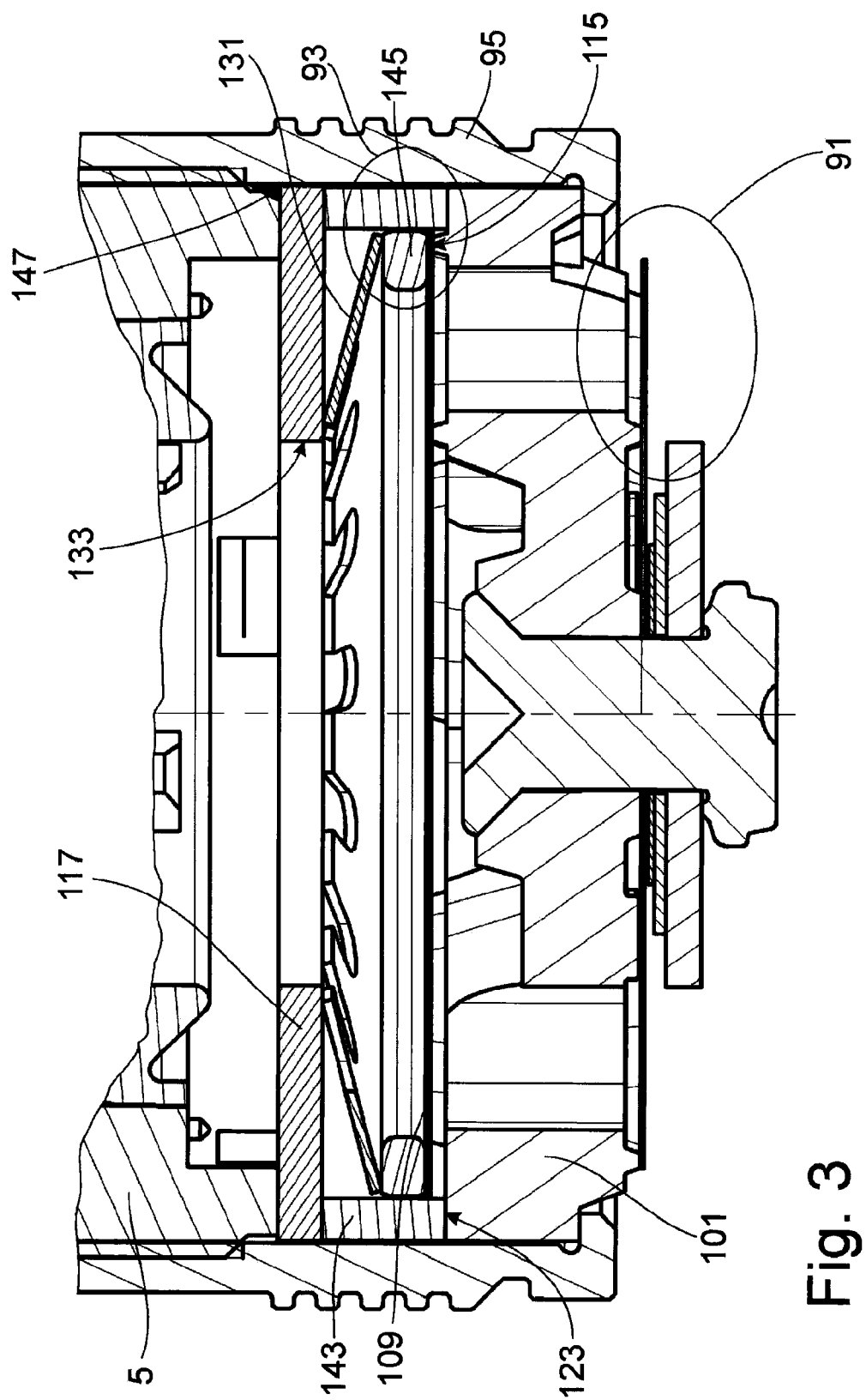
FIG. 3 is a cross-sectional view of an alternative embodiment of the supplementary valve.

FIG. 3 is limited to the depiction of the two supplementary valves inside the tubular housing 95. The construction and functioning of the auxiliary valve 23 and main stage valve 37 can correspond to the description referring to FIG. 1, but is not required for the operation of the two supplementary valves 91; 93.

The configuration of the first supplementary valve 91 is identical to that shown in FIG. 2 so that a more detailed description can be dispensed with. The at least one valve disk 109 which is radially supported at a centering ring 143 lies on the valve seat surface 115 of the second supplementary valve 93 at the supplementary valve body 101. The centering ring 143 forms a sleeve-shaped component part which is separate from the tubular housing 95 and has a constant wall thickness which is axially positioned on the supporting surface 123.

An intermediate ring 145 sits on the valve disk 109 and is likewise radially supported at the centering ring. The outer diameter of the at least one valve spring 131 lies on the intermediate ring 145. At the inner diameter, the valve disk 109 contacts the annular cover 117 which is constructed as a planar disk and is centered directly at the inner diameter of the tubular body 95.

The structural component parts forming the supplementary valves 91 and 93 can be mounted directly in the tubular body 95. In practice, the tubular body 95 forms the assembly device, thus enabling a self-contained constructional unit through fixation of the annular cover 117. The design of the annular cover makes it possible, for example, to construct the annular cover at the outer diameter with a certain overdimensioning with respect to the inner diameter of the tubular body 95 in order to achieve an interference fit. Alternatively, a plurality of press-fit stems 147 can also be formed on the annular cover 117 so as to be distributed along the inner circumference at the inner wall of the tubular body 95. A press-fit stem is formed by a small displacement of volume from the wall region of the tubular body 95 and can be carried out, e.g., by a simple chisel tool. When the tubular body 95 is fastened to the piston 5 (see FIG. 1), the constructional unit is secured regardless of the fixation of the annular cover 117.

There are some useful advantages over the embodiment shown in FIG. 2. The intermediate ring 145 offers the possibility of changing the force transmission point of the valve spring 131 on the valve disk 109 by changing the inner diameter. Further, the installation space and, therefore, the preloading of the at least one valve spring 131 can be configured in different ways through the height of the intermediate ring 145 using a standardized centering ring 143 and/or valve spring 131.

Further, due to the valve disk lifting at the inner diameter and the inwardly-facing funnel-shaped installed position of the valve spring, an efficient flow deflection can be achieved in direction of the cover opening 133 and, therefore, in the direction of the main stage valve 37. Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An adjustable piston damping valve arrangement comprising:
    an adjustable piston damping valve (37) in which flow is bidirectional;
    a first and second pressure-dependent supplementary piston valve (91; 93) movable with said adjustable piston damping valve and associated with said piston adjustable damping valve (37) in series therewith for each through-flow direction, each supplementary valve (91; 93) comprising at least one separate through-channel (103; 105) having an outlet side; at least one valve disk (107; 109) at least partially covering said outlet side; wherein the flow path proceeding from the adjustable piston damping valve (37) in flow direction is carried out through the first valve (91) from a first inlet diameter ($D_i$) to a first outlet diameter ($D_a$) that is larger than said first inlet diameter, and the at least one valve disk (107) carries out a peripheral lift movement, and wherein the flow path through the second valve (93) in flow direction to the adjustable piston damping valve (37) is implemented from a second inlet diameter ($D_1$) to a second outlet diameter ($D_2$) that is smaller than said second inlet diameter;
    additionally comprising a supplementary damping valve body (101); and wherein at least one valve disk (109) of said second piston supplementary valve (93) has an outer diameter and is constrained against radial displacement at said outer diameter;
    wherein said at least one valve disk (107) of said first supplementary piston valve (91) has an inner diameter and is constrained against radial displacement at said inner diameter.

2. The adjustable damping valve arrangement according to claim 1, wherein said valve disks (107; 109) of said first supplementary valve (91) and of said second supplementary valve (93) are fixed separately.

3. The adjustable damping valve arrangement according to claim 1, wherein said at least one through-channel (103) of said first supplementary valve (91) comprises a radial portion (141) which adjoins a center incident flow region (139).

4. The adjustable damping valve arrangement according to claim 1, wherein said second supplementary valve (93) comprises an annular cover (117) forming an interference fit with said supplementary valve body (101).

5. The adjustable damping valve arrangement according to claim 1, additionally comprising at least one valve spring (131); and wherein said second supplementary valve (93) comprises an annular cover (117); said at least one valve spring (131) being supported at said annular cover (117) and exerting a preloading force on said at least one valve disk (109) of said second valve (93).

6. The adjustable damping valve arrangement according to claim 5, additionally comprising an angle ring (125) associated with said at least one valve disk (109) of said second valve (93), said angle ring (125) having a supporting surface (127) for said at least one valve disk (109).

7. The adjustable damping valve arrangement according to claim 6, wherein said annular cover (117) comprises a web (119); and wherein said angle ring (125) is held in place radially at said web (119) of said annular cover (117).

8. The adjustable damping valve arrangement according to claim 6, wherein said angle ring (125) contacts said at least one valve disk (109) in the region of the outer diameter thereof.

* * * * *